US008678462B2

(12) United States Patent
Simon et al.

(10) Patent No.: US 8,678,462 B2
(45) Date of Patent: Mar. 25, 2014

(54) DEPLOYABLE LOAD FLOOR

(75) Inventors: Scott Simon, Dexter, MI (US); Eric Rifel, Huntington Woods, MI (US); Gian Carlo Morlet Ugalde, Huxquilucan (MX); Bhavani Thota, Sterling Heights, MI (US); Jane Maria Aselage, White Lake, MI (US); Colleen Maraffino, Northville, MI (US); Michelle Schneider, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 13/346,336

(22) Filed: Jan. 9, 2012

(65) Prior Publication Data

US 2013/0175821 A1    Jul. 11, 2013

(51) Int. Cl.
*B60R 7/04* (2006.01)

(52) U.S. Cl.
USPC ..................................... 296/37.14; 296/24.33

(58) Field of Classification Search
USPC ............... 296/37.14, 37.3, 37.16, 24.33, 24.3
See application file for complete search history.

(56) References Cited

U.S. PATENT DOCUMENTS

| 1,865,778 | A  | * | 7/1932 | Mears et al. .................. 292/217 |
| 6,695,380 | B1 | * | 2/2004 | Hicks .......................... 296/97.23 |
| 7,503,610 | B2 |   | 3/2009 | Karagitz et al. |
| 7,748,775 | B2 |   | 7/2010 | Mercurio |
| 7,992,912 | B2 | * | 8/2011 | Klotz et al. ................. 296/26.09 |
| 2007/0052254 | A1 | * | 3/2007 | Sturt et al. .................... 296/26.1 |
| 2011/0095571 | A1 |   | 4/2011 | Maguire et al. |

OTHER PUBLICATIONS

Vauxhall Meriva Highlights | Flexibility—Vauxhall Motors UK http://www.vauxhall.co.uk/vehicles/vauxhall-range/cars/new-meriva/highlights/flexibility.html Oct. 20, 2011 (2 pages).

* cited by examiner

*Primary Examiner* — Glenn Dayoan
*Assistant Examiner* — Melissa A Black
(74) *Attorney, Agent, or Firm* — Vichi Chea; Price Heneveld LLP (57) ABSTRACT

A vehicle load floor assembly having a load floor coupled with a handle. The handle is operable between first and second positions. At least one support leg is coupled to the load floor. The at least one support leg is retracted when the handle is in the first position and deployed when the handle is in the second position. A base wall supports the at least one support leg, when deployed, to maintain the load floor in a substantially lateral position. The base wall supports an underside of the load floor when the at least one support leg is retracted.

15 Claims, 9 Drawing Sheets

DEPLOYABLE LOAD FLOOR

FIELD OF THE INVENTION

The present invention generally relates to a deployable load floor, and more specifically, to a deployable load floor that is operable between lateral and canted positions.

BACKGROUND OF THE INVENTION

Load floors in the rear of vehicles are often used for storage and transporting items from one location to another. Versatility in load floors to accommodate different-sized items of varying stability is desirable.

SUMMARY OF THE INVENTION

One aspect of the present invention includes a vehicle load floor assembly having a load floor coupled with a handle. The handle is operable between first and second positions. At least one support leg is coupled to the load floor. The at least one support leg is retracted when the handle is in the first position and deployed when the handle is in the second position. A base wall supports the at least one support leg, when deployed, to maintain the load floor in a substantially lateral position. The base wall supports an underside of the load floor when the at least one support leg is retracted.

Another aspect of the present invention includes a vehicle load floor assembly having a load floor that is operable between canted and lateral positions. Support legs are moveable between a retracted position corresponding to the canted position of the load floor and a deployed position corresponding to the lateral position of the load floor. A handle on the load floor is moveable to a first position that retracts the support legs and a second position that deploys the support legs.

Yet another aspect of the present invention includes a vehicle load floor assembly having a load floor that is operable between canted and lateral positions and includes a handle disposed therein. A plurality of legs are retractable to a stored position and deployable to engage the load floor in the lateral position. A base wall is adapted to abut an underside of the load floor when the load floor is in the canted position.

Still another aspect of the present invention includes a load floor assembly having a support mechanism that is moveable between a deployed position and a retracted position. Legs of the support mechanism are actuated by fore and aft movement of a handle in a handle assembly coupled to the load floor assembly. Load floor versatility allows for accommodation of additional storage space in a canted position and also accommodates round or unstable items during transportation when the load floor is moved to a lateral position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
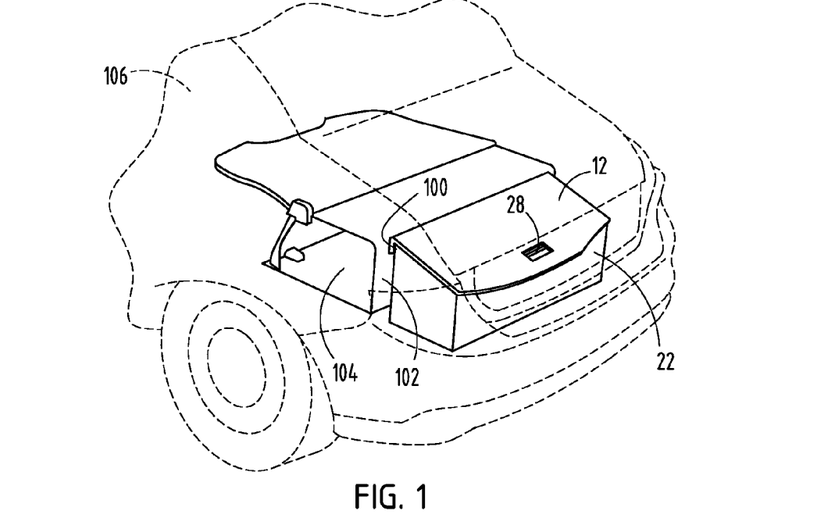
FIG. 1 is a top perspective view of one embodiment of a deployable load floor assembly of the present invention in a vehicle.

For purposes of description herein, the terms "upper," "lower," "right," "left," "rear," "front," "vertical," "horizontal," "inboard," "outboard," and derivatives thereof shall relate to the fastener as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 of the present invention generally refers to a vehicle load floor assembly having a load floor 12 coupled with a handle 14. The handle 14 is operable between first and second positions 16, 18. First and second support legs 20, 21 are coupled to the load floor 12. The first and second support legs 20, 21 are retracted when the handle 14 is in the first position 16 and deployed when the handle 14 is in the second position 18. A base wall 22 supports the first and second support legs 20, 21 when the first and second support legs 20, 21 are deployed, to maintain the load floor 12 in a substantially lateral position 24. The base wall 22 supports an underside 26 of the load floor 12 when the first and second support legs 20, 21 are retracted.

Figure 2:
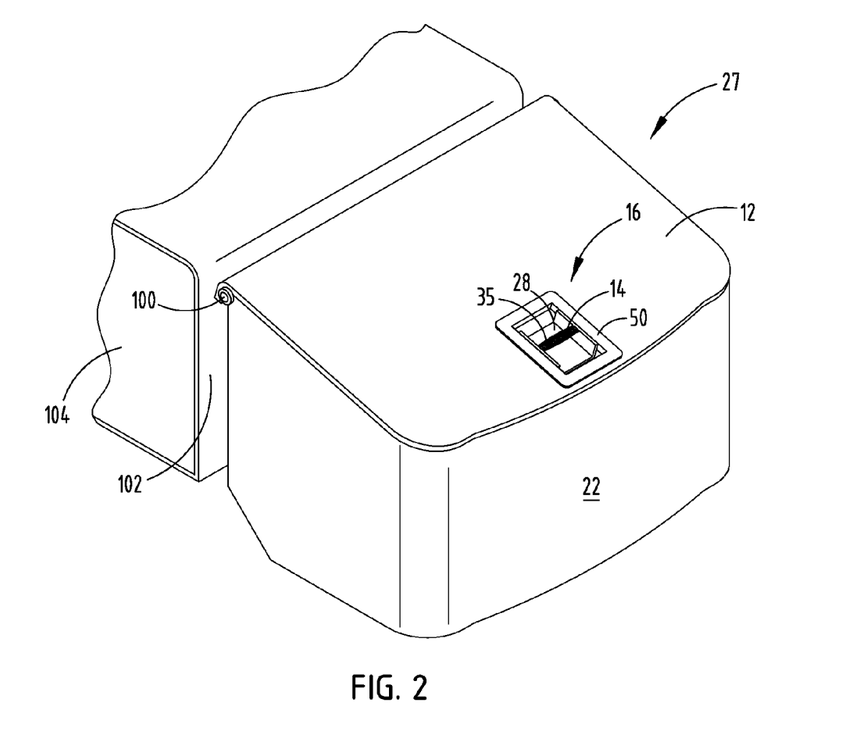
FIG. 2 is an enlarged top perspective view of the deployable load floor assembly of FIG. 1.

As generally illustrated in FIGS. 1 and 2, the present invention is directed to the vehicle load floor assembly 10 having a support mechanism 25 (FIGS. 5 and 6) for use in hybrid vehicles or Battery Electric Vehicles (BEVs) where a battery pack is located under a passenger compartment, a section of a rear load floor may be positioned higher in elevation than a rear liftgate opening. Accordingly, it is desirable to transition the load floor from the higher vertical elevation to the level of the liftgate opening for better aesthetics, as well as additional claimable storage volume. An angled load floor surface in a hybrid vehicle or a BEV can be undesirable in certain circumstances when a substantially flat load floor is desired. Stated differently, in certain circumstances, a substantially flat load floor may be favored because the angled or ramped load floor may not be ideal for transporting certain goods. Loose packages or packages that do not include a planar resting surface are not supported in a stable fashion and may fall out of the liftgate opening when a door is opened. The load floor 12 of the present invention is operable between the substantially lateral position 24 (FIG. 14) and a substantially canted position 27 (FIG. 2).

Figure 3:
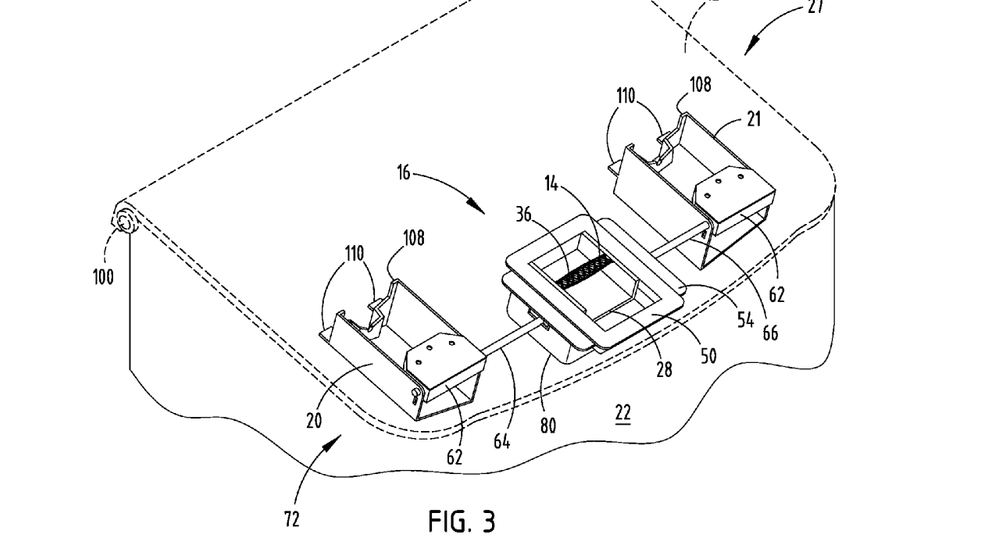
FIG. 3 is a top perspective view of a deployable load floor assembly illustrating a support mechanism.

Referring to FIGS. 3-6, the support mechanism 25 of the vehicle load floor assembly 10 includes the load floor 12, a handle assembly 28, a tie rod assembly 30, and the first and second support legs 20, 21. An aperture 35 is positioned in the load floor 12 and is configured to receive the handle assembly 28. The handle 14 forms part of the handle assembly 28. The handle 14 includes a grip portion 36 supported between first and second handle walls 40, 42. The first and second handle walls 40, 42 are supported over a lateral base wall 44 that rests inside a handle housing 46. The lateral base wall 44 is configured to slide inside and relative to the handle housing 46. Accordingly, the interface between the lateral base wall 44 and the handle housing 46 may be smooth or lubricated. Alternatively, the materials from which the lateral base wall 44 and handle housing 46 are made can have a low-coefficient of friction. The lateral base wall 44 includes first and second downwardly extending forks 48, 49 that are configured to engage a portion of the tie rod assembly 30, as disclosed in further detail below. The handle housing 46 supports the handle assembly 28 inside the load floor 12. A securing rim 50 is disposed on the load floor 12 and is coupled with first and second flanges 52, 54 of the handle housing 46 to secure the handle assembly 28 in position in the load floor 12. The securing rim 50 may be coupled with the first and second flanges 52, 54 by mechanical fasteners, snap tabs, or any other fastening arrangement generally understood by one having ordinary skill in the art. As shown in FIG. 3, the handle assembly 28 is configured to slide fore and aft inside the handle housing 46 between the first position 16 and the second position 18, respectively. At the same time, the downwardly extending forks 48, 49 are configured to slide fore and aft through slots 56 of the handle housing 46.

Figure 5:
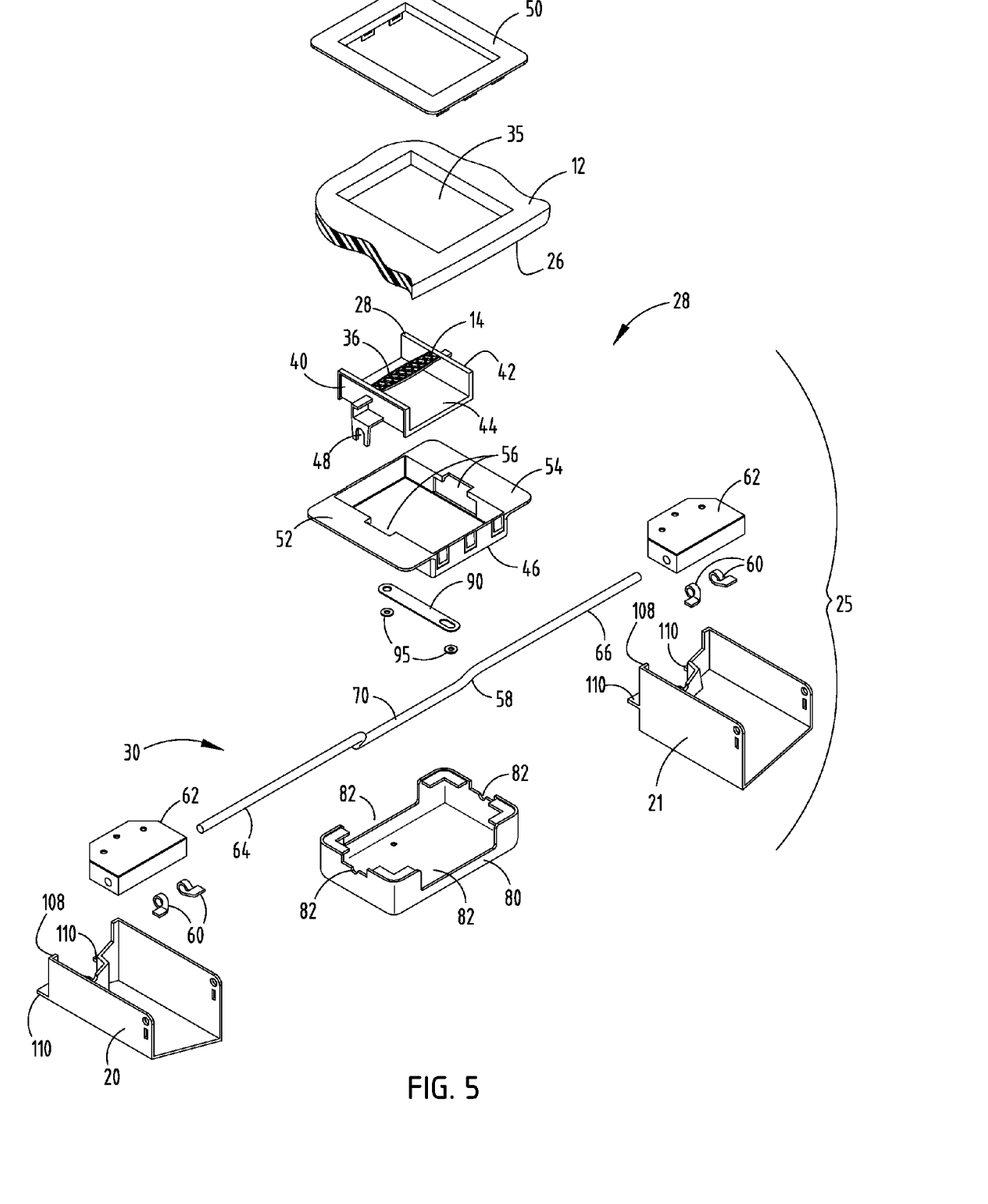
FIG. 5 is a top perspective exploded view of one embodiment of a support mechanism of the present invention.
Figure 6:
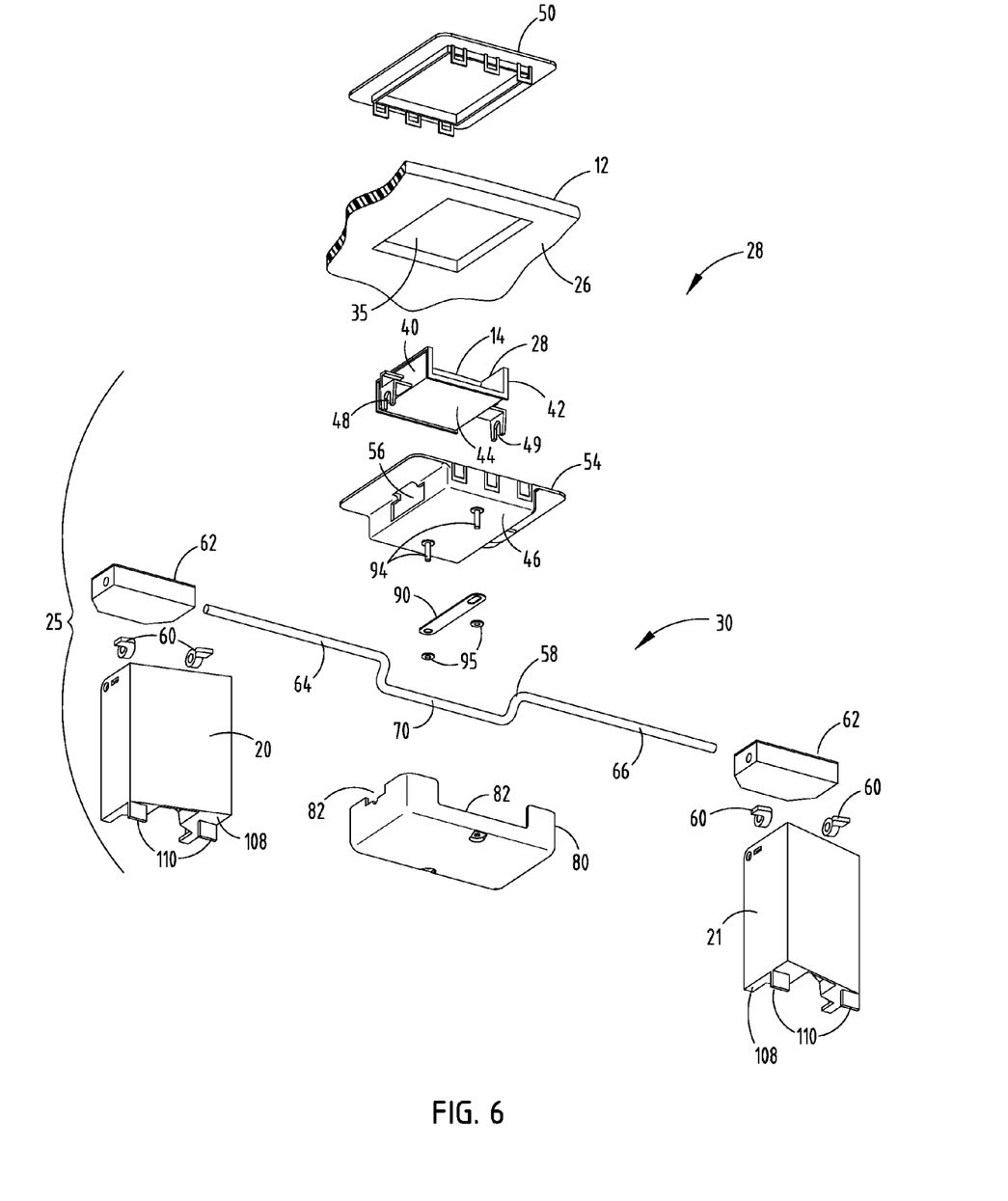
FIG. 6 is an exploded bottom perspective view of the support mechanism of FIG. 5.
Figure 14:
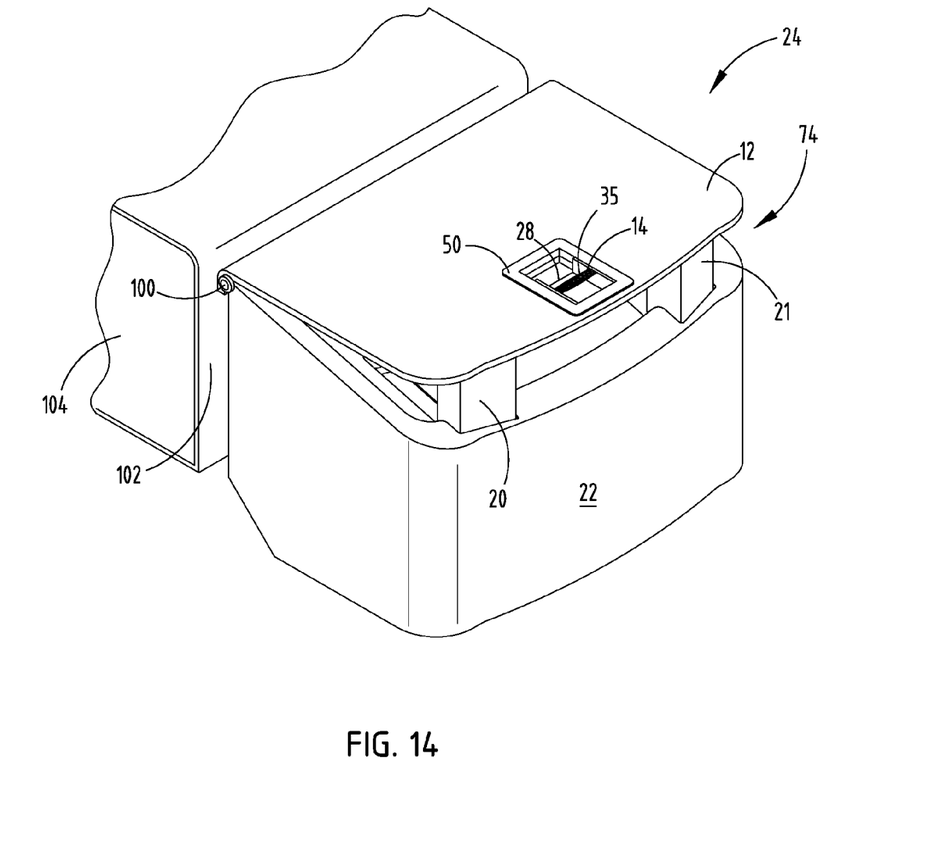
FIG. 14 is a top perspective view of a load floor assembly of the present invention in a lateral position.

As illustrated in FIGS. 5 and 6, the tie rod assembly 30 includes a tie rod 58 that is coupled with the first support leg 20 by way of securing members 60. A leg cover 62 is disposed over the securing members 60 and provides a rotatable connection of the first support leg 20 with the underside 26 of the load floor 12. As illustrated, the leg cover 62 is secured to the underside 26 of the load floor 12 by fasteners. However, it will be understood that the leg cover 62 can be secured with the underside 24 of the load floor 12 by any of a variety of fastening arrangements. The tie rod 58 includes a first end 64 that engages the first support leg 20 and a second end 66 that engages the second support leg 21. The tie rod 58 also includes an intermediate offset portion 70 configured to engage the first and second forks 48, 49. The first and second support legs 20, 21 are coupled to the first and second ends 64, 66 of the tie rod 58 such that rotation of the tie rod 58 causes rotation of the first and second support legs 20, 21 between a retracted position 72 (FIG. 7) and a deployed position 74 (FIG. 14). As illustrated, the first and second legs 20, 21 include a tubular construction. However, it will be understood that first and second legs 20,21 may have any construction and can be made of a variety of materials including wood, metal or polymers that are sufficiently strong to support the load floor 12 when in the substantially lateral position 24.

Referring again to FIGS. 5 and 6, a coverplate 80 is disposed below and covers intermediate offset portion 70, as well as an underside of the handle assembly 28. The coverplate 80 includes rod slots 82 through which the tie rod 58 extends. The coverplate 80 also includes forward and rearward apertures 82 to receive the handle housing 46. A spring assembly 90 is disposed between the handle housing 46 and coverplate 80 and acts to bias the handle 14 to the first or forward position 16 and to the second or rearward position 18, such that the handle 14 does not generally maintain a position between the forward position 16 and the rearward position 18. The spring assembly 90 includes a leaf spring that bows up in the middle to drive the intermediate offset portion 70 forward or rearward. The spring assembly 90, as shown, includes first and second apertures 91, 92 that engage downwardly extending posts 93, 94 that project downward from the handle housing 46. The downwardly extending posts 93, 94 extend through coverplate 80 and are secured by fasteners 95. Although a leaf spring is illustrated in the spring assembly 90, the spring assembly 90 could include other biasing members, including coil springs, elastic polymers, etc.

Referring to the embodiment illustrated in FIGS. 7-14 and as noted above, in operation, the vehicle load floor assembly 10 is operable between the substantially canted position 27 (FIG. 2) and the substantially lateral position 24 (FIG. 14). To move the load floor 10 from the canted position 27 to the substantially lateral position 24, a user grabs the handle 14 and lifts the load floor 12 upwardly, as shown in FIGS. 7-14. The load floor 12 will rise, rotating about a hinged portion 100 disposed at a rear of the load floor 12. The hinged portion 100 connects the rear of the load floor 12 to a rear column 102 adjacent a battery pack 104 located under a passenger compartment 106 of the vehicle.

Figure 4:
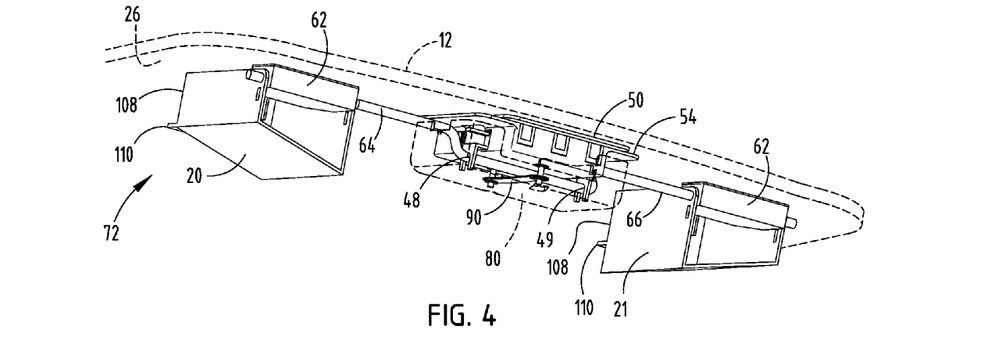
FIG. 4 is a bottom perspective view of the deployable load floor assembly of FIG. 3.
Figure 7:
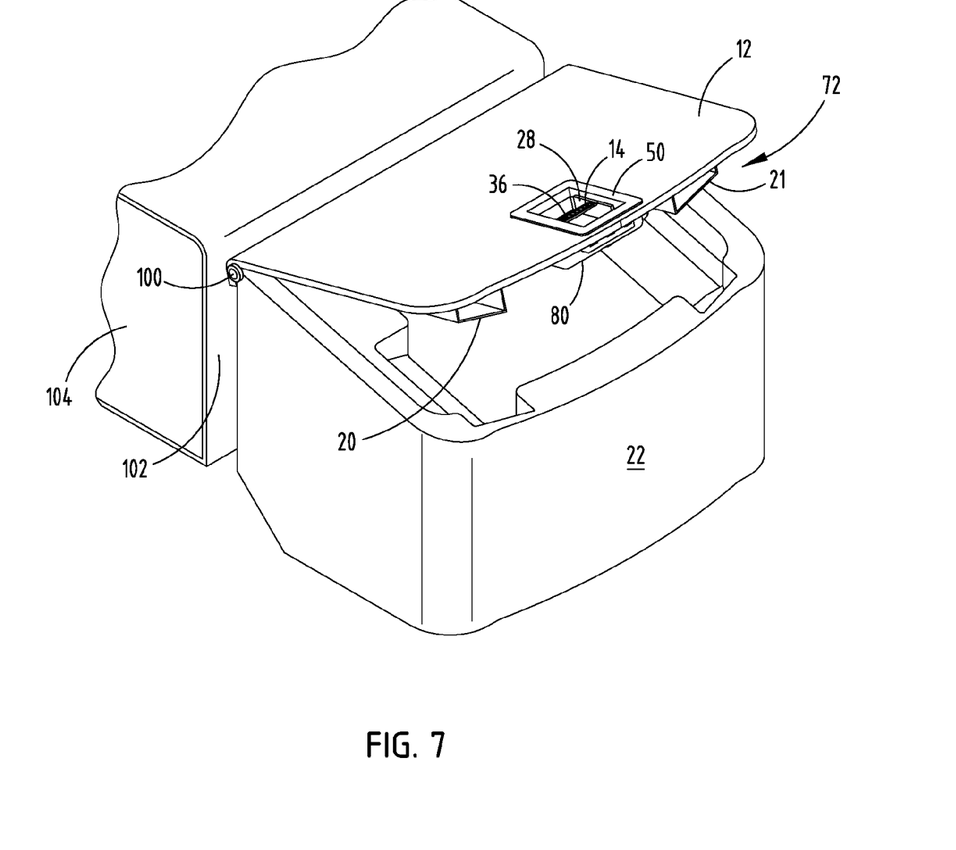
FIG. 7 is a top perspective view of a deployable load floor assembly with the load floor in a raised position.
Figure 8:
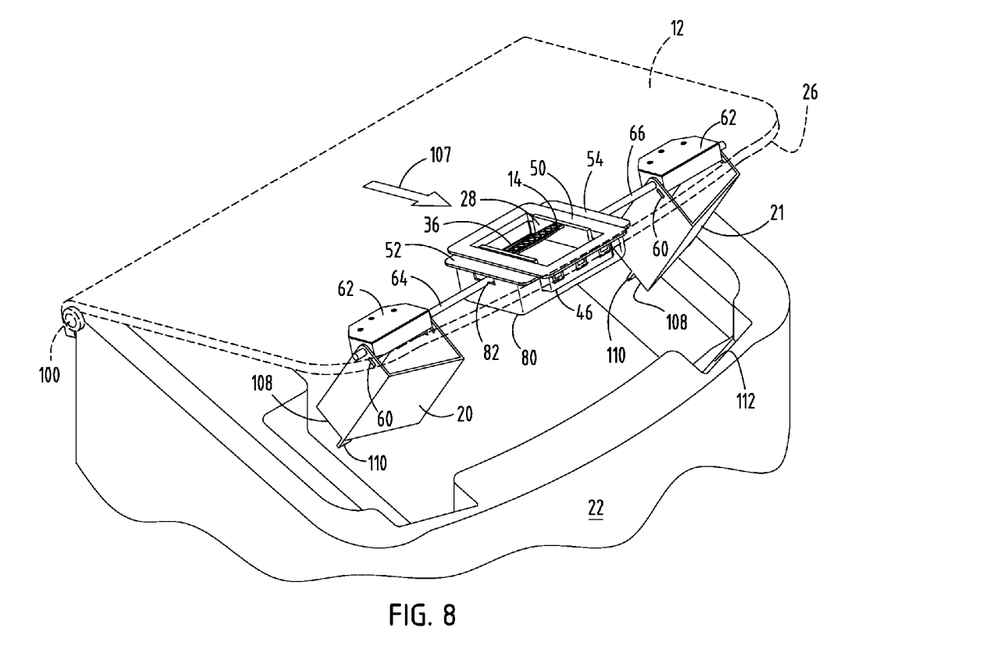
FIG. 8 is a top perspective view of the deployable load floor assembly of FIG. 7 with legs of a support mechanism moving from a retracted position to a deployed position.
Figure 9:
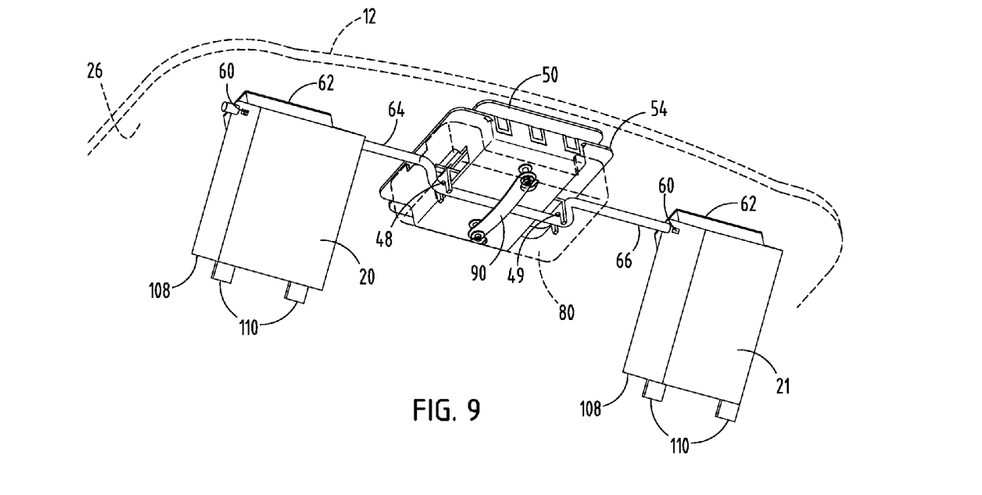
FIG. 9 is a bottom perspective view of the deployable load floor assembly of FIG. 8.
Figure 10:
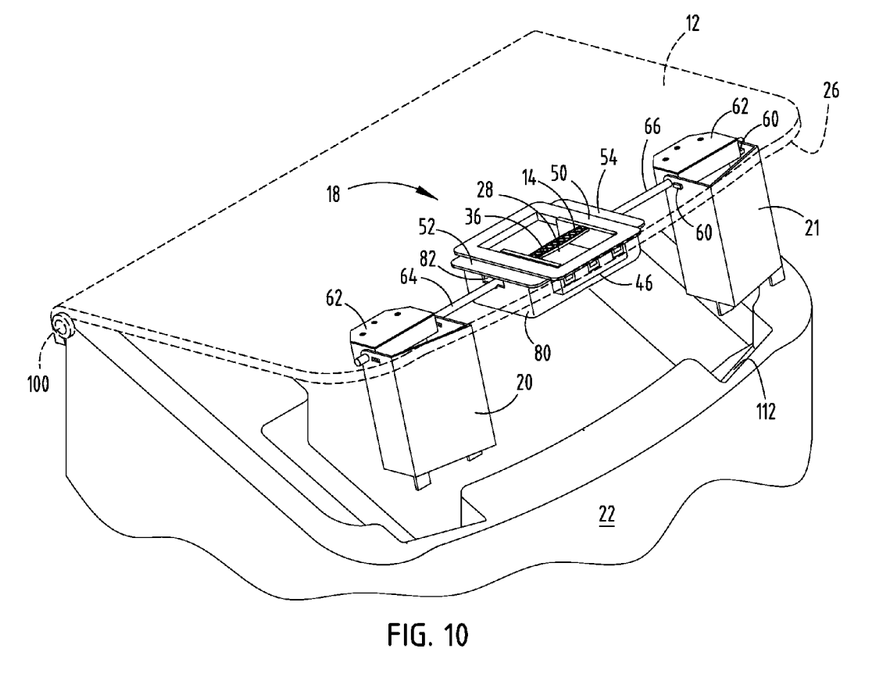
FIG. 10 is a top perspective view of a deployable load floor assembly of the present invention with legs of a support mechanism in a deployed position.
Figure 11:
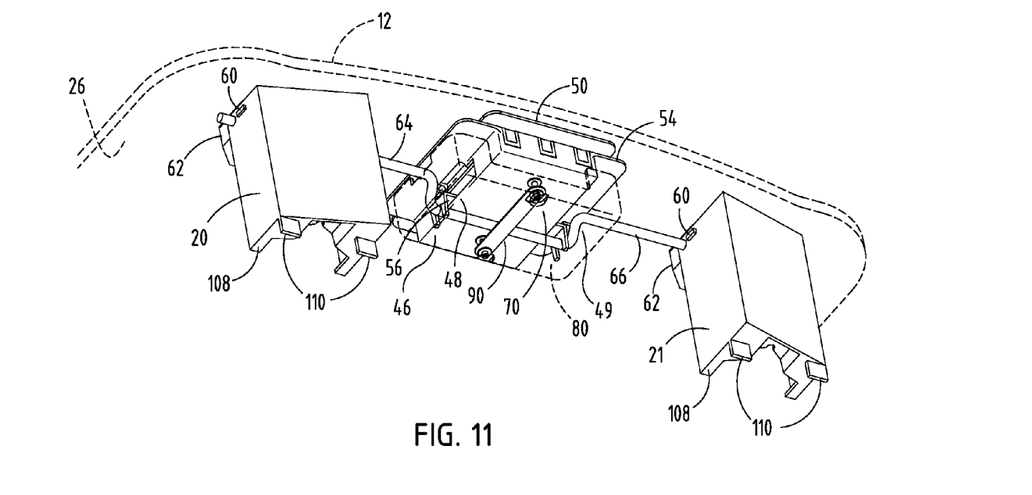
FIG. 11 is a bottom perspective view of the deployable load floor assembly of FIG. 10.
Figures 12, 12A:
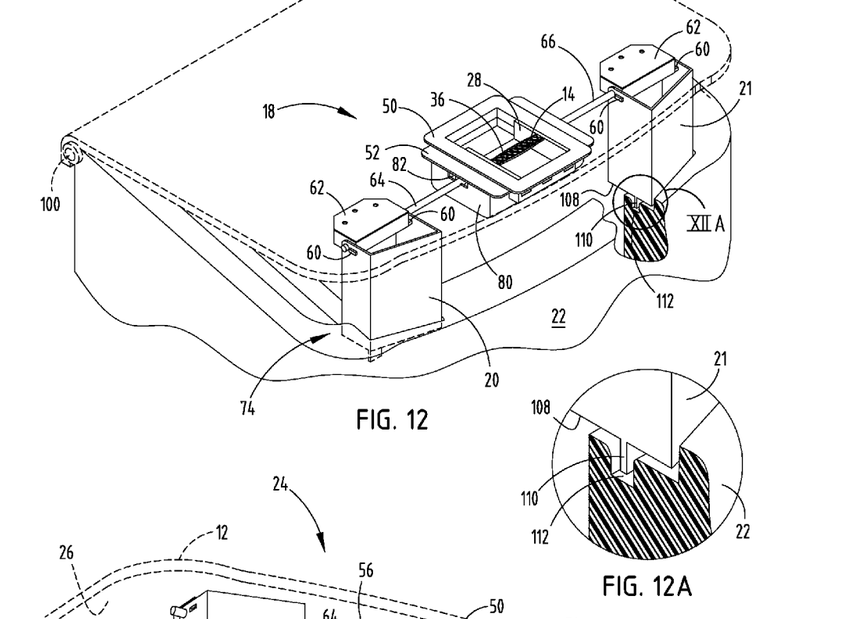
FIG. 12 is a top perspective view of a deployable load floor assembly of the present invention with legs of a support mechanism engaging a base wall.
FIG. 12A is an enlarged partial cross-sectional top perspective view of area XIIA of FIG. 12.
Figure 13:
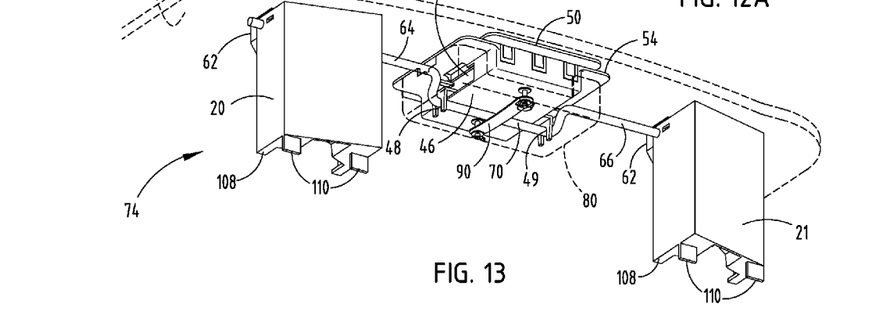
FIG. 13 is a bottom perspective view of the deployable load floor assembly of FIG. 12.

As illustrated in FIG. 7, once the load floor 12 has been rotated upward, the user then applies a rearward force in the direction of arrow 107 to the handle 14, thereby pulling the handle 14 rearward, which causes the forks 48, 49 on the handle 14 to move rearward (FIGS. 8 and 9). As the forks 48, 49 move rearward, the forks 48, 49 rotate the intermediate offset portion 70 of the tie rod 58 rearward. As the intermediate offset portion 70 rotates rearward, the first and second ends 64, 66 rotate causing downward rotational movement of the first and second support legs 20, 21 about the tie rod 58 from the lateral retracted or stored position 72 to the vertical deployed position 74 (FIG. 4). After the first and second support legs 20, 21 have been moved to the vertical deployed position 74, the load floor 12 can be lowered by the user until an engagement surface 108 of the first and second support legs 20, 21 engages the base wall 22 (FIG. 14). As illustrated in FIG. 12A, tabs 110 on the engagement surface 108 of the first and second support legs 20, 21 engage slots 112 in the base wall 22, thereby preventing slippage of the first and second support legs 20, 21 off the base wall 22. The load floor 12 is now in the substantially lateral position 24.

To move the deployable load floor assembly 10 back to the canted position 27, a user lifts the handle 14, thereby raising the load floor 12. The user then applies a forward force in the direction opposite arrow 107, which causes the first and second support legs 20, 21 to rotate back to the refracted position 72. When the first and second support legs 20, 21 are in the refracted position 72, the load floor 12 can be lowered until the underside 26 of the load floor 12 abuts the base wall 22. The handle 14 is in the forward position 16 and the load floor 12 is returned to the canted position 27. It is contemplated that the load floor 12 may be spring-biased to a raised position that assists a user to lift the load floor 12. The spring bias has the effect of lessoning the perceived weight of the load floor 12 to a user. However, the spring force is less than the weight of the load floor 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the preferred and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle load floor assembly comprising:
    a load floor including a handle that is linearly translatable in the load floor between first and second positions;
    a spring assembly that biases the handle to the first position and to the second position;
    a tie rod including an offset portion disposed between a coverplate and the handle;
    at least one support leg coupled to the load floor, wherein the at least one support leg is retracted by the tie rod when the handle is in the first position and deployed by the tie rod when the handle is in the second position; and
    a base wall that supports the at least one support leg when deployed to maintain the load floor in a substantially lateral position and that supports an underside of the load floor when the at least one support leg is retracted and the load floor is in a canted position.

2. The vehicle load floor assembly of claim 1, further comprising:
    a fork coupled to the handle and engaging the tie rod.

3. The vehicle load floor assembly of claim 1, wherein the longitudinal extent of the at least one support leg is substantially horizontal when the handle is in the first position.

4. The vehicle load floor assembly of claim 1, wherein the longitudinal extent of the at least one support leg is substantially vertical when the handle is in the second position.

5. A vehicle load floor assembly comprising:
    a load floor operable between canted and lateral positions;
    support legs that are moveable between a retracted position and a deployed position;
    a handle on the load floor that is linearly moveable to a first position that retracts the support legs and a second position that deploys the support legs; and
    a leaf spring that biases the handle to the first position and to the second position.

6. The vehicle load floor assembly of claim 5, further comprising:
    a tie rod coupling the handle to the support legs.

7. The vehicle load floor assembly of claim 5, further comprising:
    a catch tab that extends from a bottom side of each of the support legs.

8. The vehicle load floor assembly of claim 5, further comprising:
    a handle housing, wherein the handle is slidable between the first position and the second position inside the handle housing.

9. The vehicle load floor assembly of claim 5, wherein the handle is adapted to slide forward and rearward inside the handle housing.

10. The vehicle load floor assembly of claim 5, wherein the support legs include a first support leg and a second support leg, and wherein the handle is disposed between the first support leg and second support leg.

11. A vehicle load floor assembly comprising:
    a load floor moveable between canted and lateral positions by a linearly translatable handle having a downwardly extending fork that is moveable between a first position and a second position;
    a tie rod disposed between first and second legs and having an offset portion engaged with the fork, the first and second legs being biased to stored and engaged positions and configured to support the load floor in the lateral position; and
    a base wall adapted to abut an underside of the load floor when the load floor is in the canted position.

12. The vehicle load floor assembly of claim 11, further comprising:
    a coverplate disposed over the offset portion.

13. The vehicle load floor assembly of claim 11, wherein the handle is secured between a handle housing and a securing rim.

14. The vehicle load floor assembly of claim 11, wherein the load floor is rotatably connected to a rear column.

15. The vehicle load floor assembly of claim 14, further comprising:
- a spring member coupled to the load floor and the rear column, the spring member biasing the load floor to the lateral position.

* * * * *